(12) United States Patent
Rihn et al.

(10) Patent No.: US 10,216,277 B2
(45) Date of Patent: Feb. 26, 2019

(54) MODIFYING HAPTIC EFFECTS FOR SLOW MOTION

(71) Applicant: Immersion Corporation, San Jose, CA (US)

(72) Inventors: William S. Rihn, San Jose, CA (US); David M. Birnbaum, Oakland, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/052,611

(22) Filed: Feb. 24, 2016

(65) Prior Publication Data

US 2016/0246377 A1 Aug. 25, 2016

Related U.S. Application Data

(60) Provisional application No. 62/120,702, filed on Feb. 25, 2015.

(51) Int. Cl.
| | |
|---|---|
| *G06F 3/01* | (2006.01) |
| *G11B 27/00* | (2006.01) |
| *A63F 13/285* | (2014.01) |
| *A63F 13/00* | (2014.01) |
| *G06F 3/0338* | (2013.01) |
| *G06F 3/038* | (2013.01) |

(52) U.S. Cl.
CPC ............. *G06F 3/016* (2013.01); *A63F 13/00* (2013.01); *A63F 13/285* (2014.09); *G06F 3/038* (2013.01); *G06F 3/0338* (2013.01); *G11B 27/005* (2013.01); *G06F 2203/013* (2013.01); *G06F 2203/015* (2013.01)

(58) Field of Classification Search
CPC ........ A63F 13/00; A63F 13/285; G06F 3/016; G06F 2203/013; G06F 2203/015; G06F 3/0338; G06F 3/038; G11B 27/005
See application file for complete search history.

(56) References Cited

U.S. PATENT DOCUMENTS

| | | | |
|---|---|---|---|
| 9,367,136 | B2 | 6/2016 | Latta et al. |
| 9,370,459 | B2 | 6/2016 | Mahoney |
| 9,370,704 | B2 | 6/2016 | Marty |
| 9,392,094 | B2 | 7/2016 | Hunt et al. |
| 9,462,262 | B1 | 10/2016 | Worley, III et al. |
| 9,626,805 | B2 | 4/2017 | Lampotang et al. |
| 9,645,646 | B2 | 5/2017 | Cowley et al. |
| 9,652,037 | B2 | 5/2017 | Rubin et al. |
| 9,760,166 | B2 | 9/2017 | Ammi et al. |
| 9,811,854 | B2 | 11/2017 | Lucido |
| 9,851,799 | B2 | 12/2017 | Keller et al. |
| 9,933,851 | B2 | 4/2018 | Goslin et al. |
| 9,948,885 | B2 | 4/2018 | Kurzweil |
| 2004/0233167 | A1 | 11/2004 | Braun et al. |
| 2006/0255683 | A1 | 11/2006 | Suzuki et al. |

(Continued)

*Primary Examiner* — Gelek W Topgyal
(74) *Attorney, Agent, or Firm* — Miles & Stockbridge P.C.

(57) ABSTRACT

Systems and methods for generating and modifying a haptic effect are provided. Haptic effects are rendered in slow motion by modifying the various parameters associated with each haptic effect of a haptic effect sequence. For example, the magnitude, frequency, and/or duration of each haptic effect may be altered to accurately convey the haptic effect sequence in slow motion.

21 Claims, 9 Drawing Sheets

(56) References Cited

U.S. PATENT DOCUMENTS

| | | |
|---|---|---|
| 2009/0096632 A1* | 4/2009 | Ullrich .................. H04N 9/8205 340/4.21 |
| 2009/0122006 A1* | 5/2009 | Nielsen .................... A63F 13/10 345/156 |
| 2009/0128306 A1 | 5/2009 | Luden et al. |
| 2012/0223880 A1* | 9/2012 | Birnbaum ................ G06F 3/015 345/156 |
| 2013/0198625 A1 | 8/2013 | Anderson et al. |
| 2014/0002248 A1 | 1/2014 | Zawacki et al. |
| 2014/0226068 A1 | 8/2014 | Lacroix et al. |
| 2014/0267911 A1* | 9/2014 | Grant ............... H04N 21/42222 348/563 |
| 2015/0253850 A1* | 9/2015 | Behles ................. G06F 3/0488 715/702 |
| 2015/0355711 A1 | 12/2015 | Rihn |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0202760 A1* | 7/2016 | Churikov ................ G06F 3/016 345/173 |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

* cited by examiner

MODIFYING HAPTIC EFFECTS FOR SLOW MOTION

PRIORITY APPLICATION

This application claims the benefits of U.S. Provisional Patent Application No. 62/120,702, filed on Feb. 25, 2015, which is incorporated herein by reference in its entirety.

FIELD OF INVENTION

The embodiments of the present invention are generally directed to electronic devices, and more particularly, to electronic devices that produce haptic effects.

BACKGROUND

Video games and video game systems have become extremely popular. Video game devices or controllers typically use visual and auditory cues to provide feedback to a user. In some interface devices, kinesthetic feedback (e.g., active and resistive force feedback) and/or tactile feedback (e.g., vibration, texture, temperature variation, and the like) may be provided to the user. In general, such feedback is collectively known as "haptic feedback" or "haptic effects." Haptic feedback provides cues that enhance and simplify a user's interaction with a video game controller, or other electronic device. For example, haptic effects may provide cues to users of video game controllers or other electronic devices to alert the user to specific events, or provide realistic feedback to create greater sensory immersion within a simulated or virtual environment.

Other devices in which a user interacts with a user input element to cause an action also may benefit from haptic feedback or haptic effects. For example, such devices may include medical devices, automotive controls, remote controls, and other similar devices.

SUMMARY OF THE INVENTION

Embodiments of the present invention are directed toward electronic devices configured to produce haptic effects that substantially improve upon the related art.

Features and advantages of the embodiments are set forth in the description which follows, or will be apparent from the description, or may be learned by practice of the invention.

In one example, systems and methods for rendering haptic effects in slow motion are provided. A media stream (e.g., audio or video) and a haptic effect sequence that corresponds to the media stream are received. The haptic effect sequence includes a plurality of haptic effects. The media stream and the haptic effect sequence may be rendered in real-time. The media stream and a modified haptic effect sequence may also be rendered in slow motion. The modified haptic effect sequence includes a change to a parameter of at least one haptic effect of the haptic effect sequence.

It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Example embodiments are directed toward systems and methods for rendering modified haptic effects in slow motion. Although video may be accurately conveyed to a user in slow motion, the corresponding haptic effects are typically inaccurately rendered in slow motion. Accordingly, the various embodiments described herein render haptic effects in slow motion by modulating/modifying the various parameters associated with each haptic effect of a haptic effect sequence. For example, the magnitude, frequency, and/or duration of each haptic effect may be altered to accurately convey the haptic effect sequence in slow motion.

In the various embodiments, a variety of user interfaces and methods for using a device are described. In some embodiments, the device is a portable electronic device (e.g., a game controller, console, mobile phone, smartphone, tablet, etc.). It should be understood, however, that the user interfaces and associated methods may be applied to numerous other devices, such as personal computers, medical devices, laptops, and the like that may include one or more other physical user-interface devices, such as a keyboard, mouse, trackball and the like.

Figure 1:
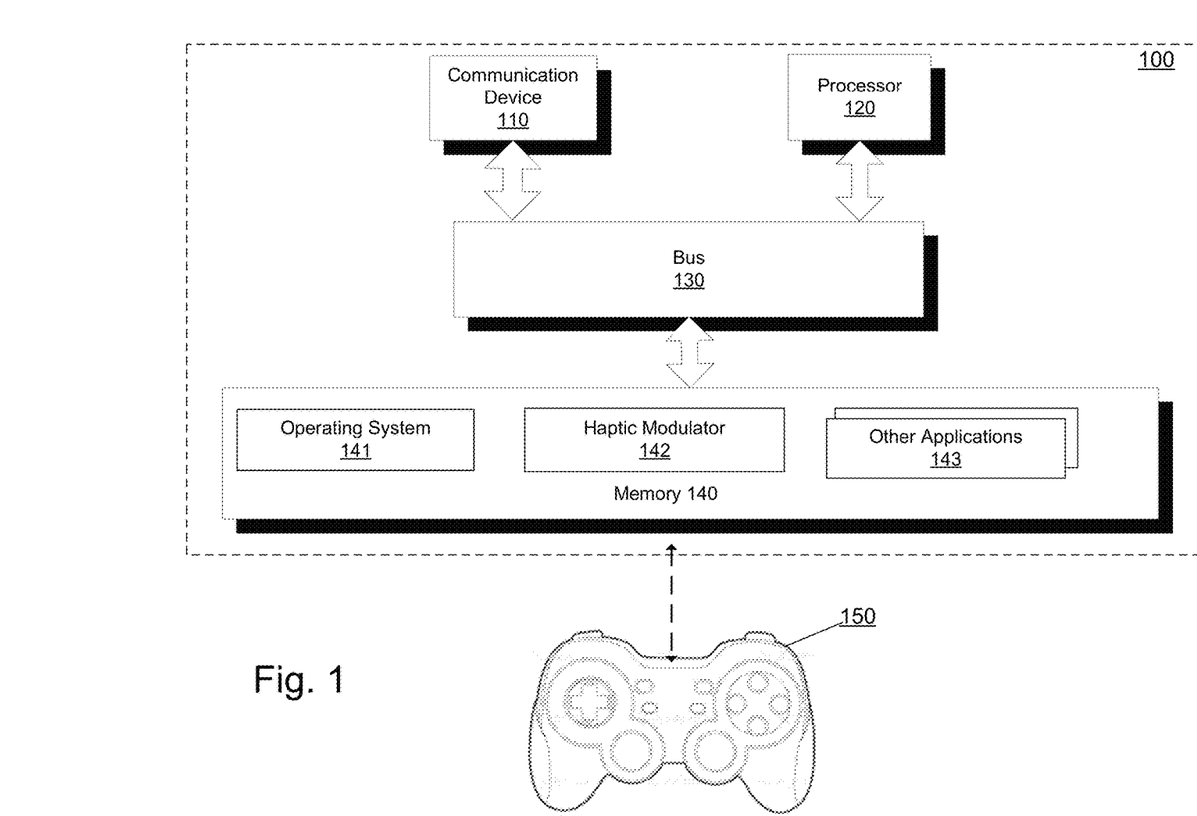
FIG. 1 illustrates a block diagram of a system according to an example embodiment of the invention.

FIG. 1 illustrates a block diagram of a system 100 according to an example embodiment of the invention.

System 100 may include a communication device 110 configured to transmit and/or receive data from remote sources. Communication device 110 may enable connectivity between a processor 120 and other devices by encoding data to be sent from processor 120 to another device over a network (not shown) and decoding data received from another system over the network for processor 120.

For example, communication device 110 may include a network interface card that is configured to provide wireless network communications. A variety of wireless communication techniques may be used including infrared, radio, Bluetooth, Wi-Fi, and/or cellular communications. Alternatively, communication device 110 may be configured to provide wired network connection(s), such as an Ethernet connection.

Processor 120 may comprise one or more general or specific purpose processors to perform computation and control functions of system 100. Processor 120 may include a single integrated circuit, such as a micro-processing device, or may include multiple integrated circuit devices and/or circuit boards working in cooperation to accomplish the functions of processor 120. In addition, processor 120 may execute computer programs, such as an operating system 141, a haptic modulator 142, and other applications 143, stored within memory 140.

System 100 may include memory 140 for storing information and instructions for execution by processor 120. Memory 140 may contain various components for retrieving, presenting, modifying, and storing data. For example, memory 140 may store software modules that provide functionality when executed by processor 120. The modules may include operating system 141 that provides operating system functionality for system 100. The modules may further include haptic modulator 142 that may control a variety of haptic parameters (e.g., magnitude, frequency, and/or duration) to modify haptic effects during replay at a varied playback rate, such as slow motion replay. In certain embodiments, haptic modulator 142 may include instructions for dynamically calculating the haptic parameters based on analysis of a media stream, such as audio and/or video streams. System 100 also may include one or more additional application modules 143 that include additional functionality, such as peripheral firmware configured to provide control functionality for a peripheral device, such as controller 150 (e.g., a gamepad, wearable device, etc.).

Non-transitory memory 140 may include a variety of computer-readable media that may be accessed by processor 120. In the various embodiments, memory 140 may include volatile and nonvolatile medium, removable and non-removable medium. For example, memory 140 may include any combination of random access memory ("RAM"), dynamic RAM ("DRAM"), static RAM ("SRAM"), read only memory ("ROM"), flash memory, cache memory, and/or any other type of non-transitory computer-readable medium.

Although shown as a single system, the functionality of system 100 may be implemented as a distributed system. For example, memory 140 and processor 120 may be distributed across multiple different computers that collectively comprise system 100. In one embodiment, system 100 may be part of a device (e.g., personal computer, console, video game console, etc.), and system 100 provides haptic effect functionality for the device. In another embodiment, system 100 may be separate from the device, and may remotely provide the aforementioned functionality for the device.

System 100 may be operably connected to controller 150. Controller 150 may be a peripheral device configured to provide input to the system 100. Controller 150 may be operably connected to system 100 using either a wireless connection or a wired connection. Controller 150 also may include a local processor configured to communicate with system 100 using either a wireless connection or a wired connection. Alternatively, controller 150 may be configured to not include a local processor, and all input signals and/or output signals associated with controller 150 may be processed by the components of system 100. In embodiments in which controller 150 has a local processor, additional functionality, such as haptic modification modules and peripheral firmware configured to provide control functionality may reside within controller 150.

Controller 150 may further include one or more digital buttons, one or more analog buttons, one or more bumpers, one or more directional pads, one or more analog or digital sticks, one or more driving wheels, and/or one or more user input elements that can be interacted with by a user, and that can provide input to system 100. Controller 150 may also include one or more analog or digital trigger buttons (or "triggers") that can further be interacted with by the user, and that can further provide input to system 100. As is described below in greater detail, controller 150 can further include a motor, or another type of actuator or haptic output device, configured to exert a bi-directional push/pull force on at least one trigger of controller 150.

Controller 150 can also include one or more actuators, or other types of haptic output devices. The local processor of controller 150, or processor 120 in embodiments where controller 150 does not include a local processor, may transmit a haptic signal associated with a haptic effect to at least one actuator of controller 150. The actuator, in turn, outputs haptic effects such as vibrotactile haptic effects, kinesthetic haptic effects, or deformation haptic effects, in response to the haptic signal. The haptic effects can be experienced at a user input element (e.g., a trigger, digital button, analog button, bumper, directional pad, analog or digital stick, driving wheel, or trigger) of controller 150. Alternatively, the haptic effects can be experienced at an outer surface of controller 150.

An actuator is an example of a haptic output device, where a haptic output device is a device configured to output haptic effects, such as vibrotactile haptic effects, electrostatic friction haptic effects, temperature variation, and/or deformation haptic effects, in response to a drive signal. In alternate embodiments, the one or more actuators within controller 150 can be replaced by some other type of haptic output device. The haptic output device may be, for example, an electric motor, an electro-magnetic actuator, a voice coil, a shape memory alloy, an electro-active polymer, a solenoid, an eccentric rotating mass motor ("ERM"), a harmonic ERM motor ("HERM"), a linear resonant actuator ("LRA"), a piezoelectric actuator, a high bandwidth actuator, an electroactive polymer ("EAP") actuator, an electrostatic friction display, or an ultrasonic vibration generator. In some instances, the haptic output device may include haptic output drive circuit. In some embodiments, the haptic output device may be unidirectional or bidirectional.

Controller 150 may further include one or more speakers. The local processor of controller 150, or processor 120 in embodiments where controller 150 does not include a local processor, may transmit an audio signal to at least one speaker of controller 150, which in turn outputs audio effects. The speaker may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Controller 150 can further include one or more sensors. A sensor may be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. The sensor may further be configured to convert the detected energy, or other physical property, into an electrical signal, or any signal that represents virtual sensor information, and controller 150 can send the converted signal to the local processor of controller 150, or processor 120 in embodiments where controller 150 does not include a local processor.

Figure 2:
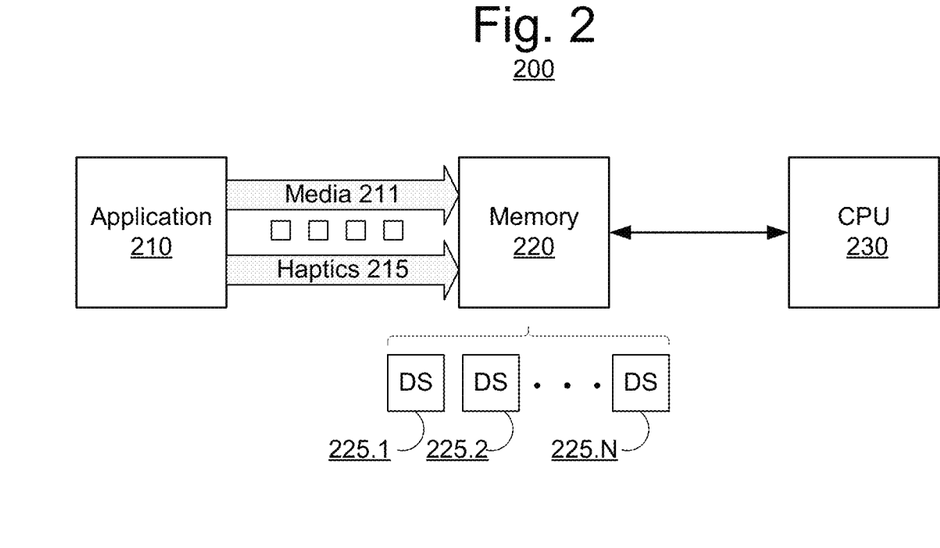
FIG. 2 is a simplified block diagram illustrating a system for modifying haptic effects according to an example embodiment of the present invention.

FIG. 2 is a simplified block diagram illustrating a system 200 for modifying haptic effects according to an example embodiment of the present invention.

As shown in FIG. 2, a central processing unit ("CPU") 230 may execute various programs, such as an application 210. Application 210 generates media streams including audio and/or video streams, such as media stream 211. In addition, application 210 generates haptic instructions, such as haptic instructions 215. CPU 230 may modify haptic instructions 215 based on a variety of parameters that are determined by analyzing media stream 211. For example, CPU 230 may alter the haptic instructions 215 based on a change in camera angle, or a change in replay speed. CPU 230 may further determine and/or adjust the execution times of the haptic instructions.

Media stream 211 and haptic instructions 215 may be stored in a memory 220. Memory 220 also stores data structures 225.1-225.N, each of the data structures defining characteristics associated with respective haptic output devices. CPU 230 may execute haptic instructions or determine changes to haptic instructions according to data structures 225.1-225.N. For example, data structures 225.1-225.N may store one or more values relating to minimum drive frequency, maximum drive frequency, minimum strength, maximum strength, startup current, steady state current, and the like that may be used by CPU 230 when modifying haptic effects for each haptic output device.

Modified haptic effects may be generated in a variety of ways. For example, a slow motion haptic effect may increase the duration of the haptic effect to match the slowing of the visual component. In another example, a constant haptic effect may become a periodic effect, or alternatively, the periodic haptic effect may become the constant haptic effect. In yet another example, the magnitude of the slow motion haptic effect may increase or decrease in strength, or may gradually fade out or ramp up. In an example of frequency shifting, if the real-time haptic effect is 10 ms on and 10 ms off, the corresponding slow motion haptic effect may be modified to 16 ms on and 16 ms off, or alternatively changed from 20 ms on/off and gradually decreased to 5 ms on/off. In the various frequency shifting embodiments, one or more filters may be configured to modify the haptic effects within a particular frequency range.

Although the embodiments described herein may be used in numerous applications, some non-limiting examples will now be described to better illustrate the embodiments. Within a gaming application, a game player is a first person shooter and dies from an explosion. In this explosion, haptic effects are played on one of or both of the triggers and/or the rumble actuators of controller 150. After the game player's death, a slow motion video of the action (e.g., from a third person perspective) may be played. Here, the haptic effects may be changed from what was previously felt, to a weaker and more elongated version. Upon slow motion replay, the haptic effects may be altered to take camera angle and/or replay speed into consideration, which may optionally include dynamic haptic effects. In addition, the various embodiments may be applied to a variety of haptic effects, such as an "effect within effect," which provides an ability to play two or more simultaneous effects due to the slower playback rate (such as playing an effect between elongated gaps in a complex texture), whereas in real-time a priority system may prevent multiple effects from playing.

Thus, the embodiments may be configured to render slow motion haptic effects based on an initial haptic effect. In the various configurations, the haptic effect parameters may be dynamically changed, or selected from a set of predetermined slow motion haptic effects.

Figure 3:
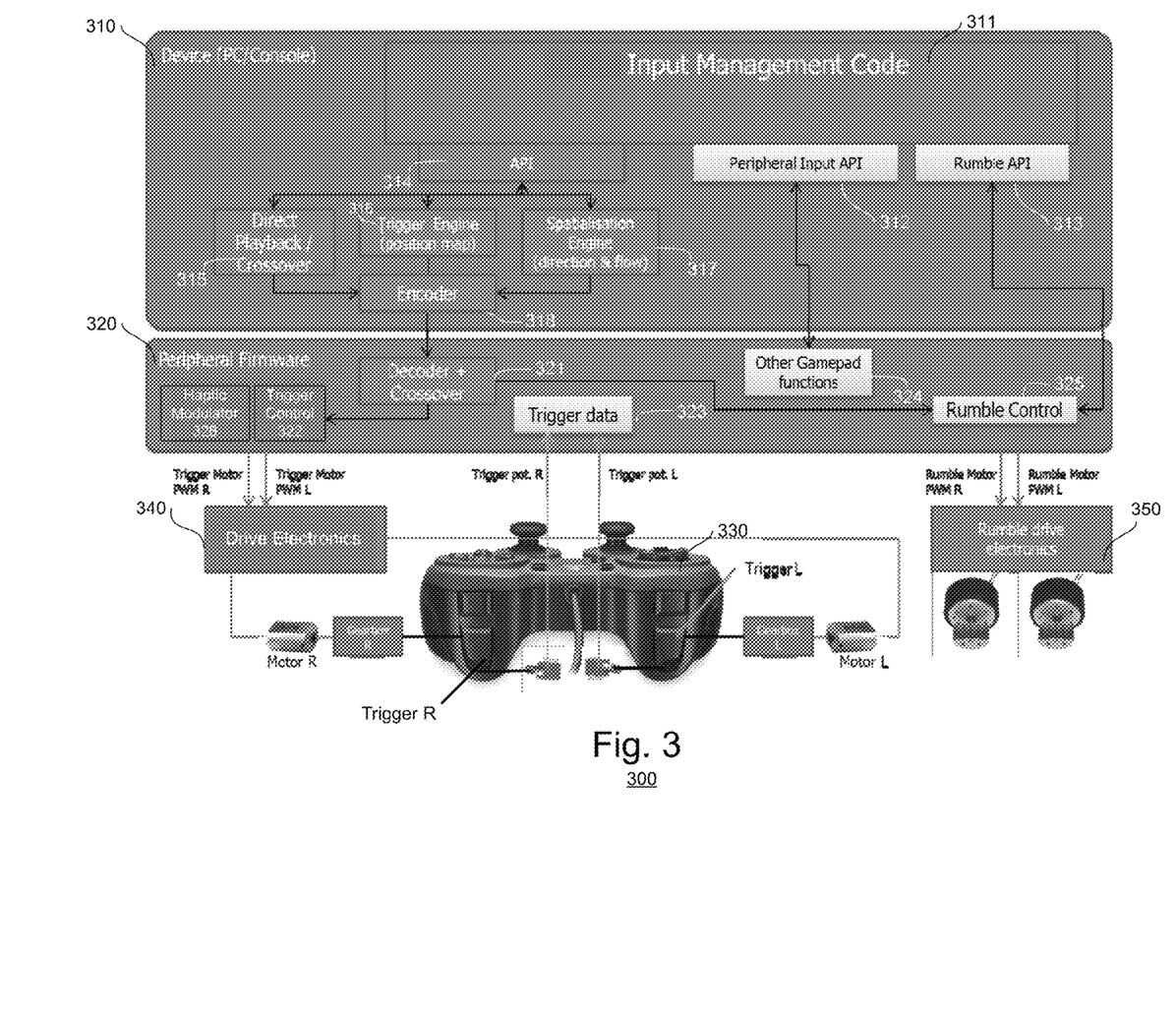
FIG. 3 illustrates a block diagram of a haptic effect software stack according to an example embodiment of the present invention.

FIG. 3 illustrates a block diagram of a haptic effect software stack 300 according to an example embodiment of the present invention. As shown in FIG. 3, software stack 300 includes device modules 310, peripheral firmware modules 320, controller modules 330, drive modules 340, and rumble drive modules 350. Haptic effect software stack 300 is implemented on a system, such as system 100 of FIG. 1.

Device modules 310 may include a variety of modules such as input management code 311, peripheral input application programming interface ("API") 312, rumble API 313, haptic effect API 314, direct playback/crossover 315, trigger engine 316, spatialization engine 317, and encoder 318.

Input management code 311 may include a set of computer-readable instructions that manage input provided by controller 330 in the context of a game application, or other type of application, executed within a device.

Peripheral input API 312 may include a set of computer-readable functions or routines that enable game input management code 311 to interact with peripheral firmware 320 in order to receive and manage input provided by controller 330.

Rumble API 313 may include a set of computer-readable functions or routines that enable input management code 311 to interact with peripheral firmware 320 in order to transmit rumble instructions to one or more rumble motors or rumble actuators of controller 330 (e.g., rumble motors L and R of FIG. 3). In addition, a rumble instruction may cause a rumble motor or rumble actuator of controller 330 to produce a general or rumble haptic effect.

Haptic effect API 314 (identified in FIG. 3 as "API") may include a set of computer-readable functions or routines that are accessible to input management code 311, and that enable input management code 311 to interact with peripheral firmware 320 in order to transmit haptic instructions to controller 330. In addition, a haptic instruction may cause one or more targeted motors or targeted actuators of controller 330 to produce a haptic effect at one or more user input elements of controller 330.

Haptic effect API 314 also may store one or more haptic effect definitions. A haptic effect definition is a data structure that includes haptic data, such as a haptic signal, that is pre-defined and that can be stored within a storage, such as a haptic file or haptic stream, and that can be sent to one or more rumble motors, rumble actuators, targeted motors, or targeted actuators, to produce a haptic effect at a component, or user input element, of controller 330. The haptic data can include one or more attributes of the corresponding haptic effect, where the attributes can be stored as parameters. Example parameters of a haptic effect definition may include an amplitude parameter, a frequency parameter, a waveform parameter, an envelope parameter, a magnitude (or strength) parameter, and a duration parameter.

Haptic effect API 314 may enable game input management code 311 to interact with direct playback/crossover 315, trigger engine 316, and spatialization engine 317, and may further manage direct playback/crossover 315, trigger engine 316, and spatialization engine 317 according to requests invoked by game input management code 311. Further, haptic effect API 314 may store data used for communication with peripheral firmware 320, and used for generation of one or more haptic effects.

Direct playback/crossover 315 may receive haptic data as input, produce haptic data as output, and transmit haptic data to one or more targeted motors, or targeted actuators, of controller 330 (e.g., motors L and R of FIG. 3). In some embodiments, direct playback/crossover 315 may output the input haptic data directly, without modifying a format of the input haptic data. This results in an "as-is" playback of the input haptic data. In other embodiments, direct playback/crossover 315 may convert the haptic data that is input from a first format to a second format, and can further output the converted haptic data. Depending on the type of playback, direct playback/crossover 315 may optionally use a programmable crossover to convert the haptic data. By converting the haptic data, device modules may deconstruct the haptic effect and playback the haptic effect at multiple actuators.

The format of the haptic data may be a haptic elementary stream ("HES") format. A HES format is a file or data format for representing haptic data that may be streamed to a device. The haptic data can be represented in a manner that is identical or similar to how uncompressed sound is represented, although the haptic data can be encrypted within the HES format.

Trigger engine 316 may receive haptic data, such as a haptic effect definition, and may modify the haptic data based on user input data, such as trigger data 323. Trigger data is data that includes one or more parameters that indicate a position and/or range of one or more triggers of controller 330 (e.g., triggers L and R of FIG. 3). Trigger engine 316 may further transmit haptic instructions to controller 330. For example, trigger engine 316 may transmit haptic instructions to a variety of user-input elements of controller 330. As previously described, a haptic instruction may cause one or more targeted motors or targeted actuators of controller 330 to produce a haptic effect at one or more user-input elements of controller 330.

Spatialization engine 317 may receive haptic data and may modify the haptic data based on spatialization data. Spatialization data may include data that indicates a desired direction and/or flow of a haptic effect, such as an ordering of haptic effects on respective user input elements. In certain embodiments, spatialization engine 317 may receive spatialization data that includes a direction and/or flow from input management code 311.

Spatialization engine 317 may modify the haptic data so that a haptic effect, such as a trigger haptic effect, is scaled for one or more rumble motors, or rumble actuators, of controller 330 (e.g., rumble motors L and R of FIG. 3), and that the haptic effect is also scaled for one or more targeted motors, or targeted actuators, of controller 330 (e.g., motors L and R, as illustrated in FIG. 3). In other words, spatialization engine 317 may modify the haptic data that is sent to each motor or actuator, and thus, modify the haptic effect that is experienced at each motor or actuator, in order to convey a sense of direction and flow of an overall haptic effect. For example, in order to emphasize a haptic effect experienced at a motor or actuator, spatialization engine 317 may scale one or more portions of the haptic effect. For example, spatialization engine 317 may scale haptic data that is sent to the motor or actuator that causes the haptic effect to be experienced, causing the haptic effect to be more pronounced (e.g., increased magnitude, duration, etc.). Additionally, spatialization engine 317 may scale haptic data that is sent to other motors or actuators, causing other haptic effects that are experienced at those motors or actuators to be less pronounced (e.g., decreased magnitude, duration, etc.). In some embodiments, spatialization engine 317 may modify the haptic data in real-time or substantially in real-time. Further, in some embodiments, spatialization engine 317 may have non-linear relationships between inputs and motor, or actuator, outputs in order to exaggerate an overall haptic effect.

Encoder 318 encodes haptic data received from direct playback/crossover 315, trigger engine 316, and/or spatialization engine 317 into a format. In one embodiment, the format may be an HES format. Encoder 318 may transmit the encoded haptic data to peripheral firmware 320.

Peripheral firmware 320 is firmware for one or more peripheral devices (e.g., controllers). Peripheral firmware 320 may include a variety of modules such as decoder and crossover 321, trigger control 322, trigger data 323, other functions 324, and rumble control 325.

Decoder and crossover 321 may receive the encoded haptic data from encoder 318 and decodes the encoded haptic data. In some embodiments, decoder and crossover 321 computes a programmable crossover in order to decode the encoded haptic data. Decoder and crossover 321 may compute the programmable crossover in real-time.

Trigger control 322 is a low-level control API for one or more targeted motors or targeted actuators of controller 330 (e.g., motors L and R of FIG. 3). Trigger control 322 may receive a trigger instruction and may convert the trigger instruction into a low-level trigger instruction for a specified targeted motor or targeted actuator of controller 330, and may transmit the low-level trigger instruction to the specified targeted motor or targeted actuator of controller 330. The low-level trigger instruction may cause the specified targeted motor or targeted actuator to produce a trigger haptic effect at a specified trigger of controller 330.

Trigger data 323, as previously described, is data that includes one or more parameters that indicate a position and/or range of one or more triggers of controller 330 (e.g., triggers L and R of FIG. 3). Trigger data 323 may be received from controller 330 by peripheral firmware 320. Peripheral firmware 320 may further store trigger data 323, and may further transmit trigger data 323 to device modules 310.

Other gamepad functions 324 may be functions of controller 330 managed by peripheral firmware 320. Such functions may include such functions as wired/wireless communications, input reporting, protocol implementation, power management, etc.

Rumble control 325 is a low-level control API for one or more rumble motors or rumble actuators of controller 330 (e.g., rumble motors L and R of FIG. 3). Rumble control 325 may receive a rumble instruction, may convert the rumble instruction into a low-level rumble instruction for a specified rumble motor or rumble actuator of controller 330, and may transmit the low-level trigger instruction to the specified rumble motor or rumble actuator of controller 330.

Haptic modification module 326 may be a firmware module or standalone hardware chip (e.g., application specific integrated circuit, also referred to as "ASIC") that may modify the haptic effects of the haptic output devices of controller 330. Haptic modification module 326 may be configured to control a variety of haptic parameters (e.g., magnitude, frequency, duration) to modify haptic effects during replay at a varied playback rate, such as slow motion replay. In certain embodiments, modification module 326 may include instructions for dynamically calculating the haptic parameters based on analysis of a media signal, such as audio and/or video. Haptic modification module 326 and haptic modulator 142 of FIG. 1 may be the same modules.

Controller 330 may include triggers L and R. Controller 330 may further include gear boxes L and R and motors L and R. Motor L and gearbox L are operably coupled to trigger L within controller 330. Likewise, motor R and gearbox R are operably coupled to trigger R within controller 330. When motor L receives a trigger instruction, motor L and gearbox L may collectively cause a trigger haptic effect to be experienced at trigger L. Likewise, when motor R receives a trigger instruction, motor R and gearbox R may collectively cause a trigger haptic effect to be experienced at trigger R. Peripheral firmware 320 may send trigger instructions to motors L and R of controller 330 using drive electronics 340.

Controller 330 may further include potentiometers L and R. Potentiometer L may detect a position and/or range of trigger L, and may further send the detected position and/or range of trigger L to peripheral firmware 320 as trigger data. Likewise, potentiometer R may detect a position and/or range of trigger R, and may further send the detected position and/or range of trigger R to peripheral firmware 320 as trigger data.

Controller 330 may further include rumble motors L and R. When rumble motor L receives a rumble instruction, rumble motor L causes a haptic effect to be experienced along a left component of controller 330. Likewise, when rumble motor R receives a rumble instruction, rumble motor R causes a haptic effect to be experienced along a right component of controller 330. Peripheral firmware 320 may send rumble instructions to rumble motors L and R using rumble drive electronics 350.

Figure 4:
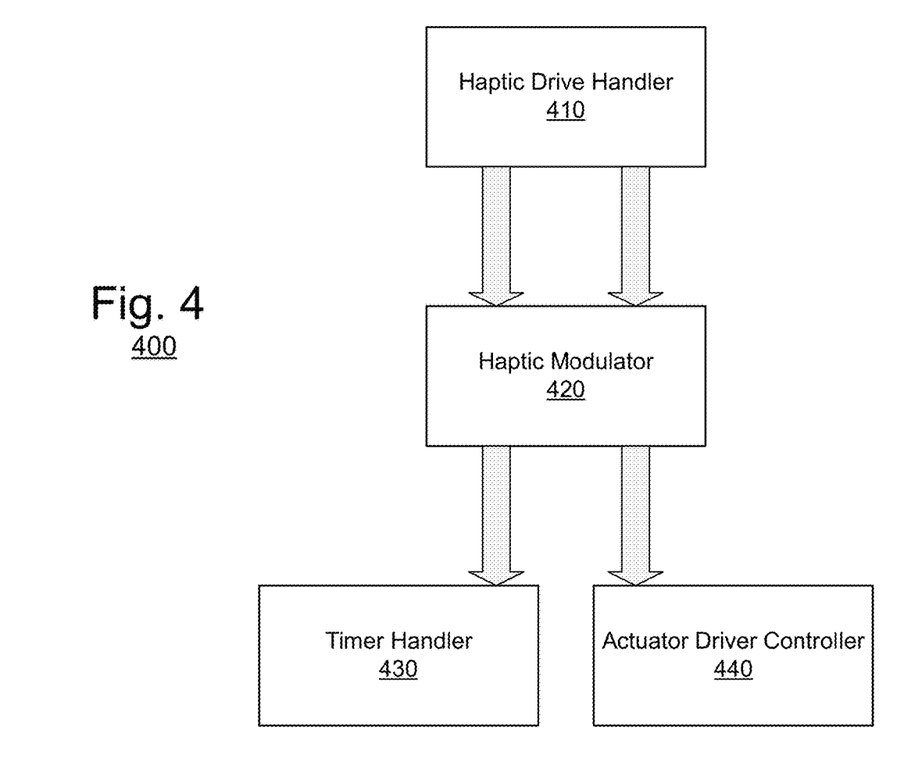
FIG. 4 illustrates an architecture for haptic modification according to an example embodiment of the present invention.

FIG. 4 illustrates a haptic modification architecture according to an example embodiment of the present invention.

A haptic drive handler 410 may be configured with a timer handler 430 to track the timing and state of each haptic output device. Disposed between haptic drive handler 410 and timer handler 430, a haptic modulator 420 may be configured to modify haptic effects that are distributed among the haptic output devices. In addition, haptic modulator 420 may be configured to control a variety of haptic parameters (e.g., magnitude, frequency, duration) to modify haptic effects during replay at a varied playback rate, such as slow motion replay. In certain embodiments, haptic modulator 420 may include instructions for dynamically calculating the haptic parameters based on analysis of a media signal, such as audio and/or video.

Figure 5:
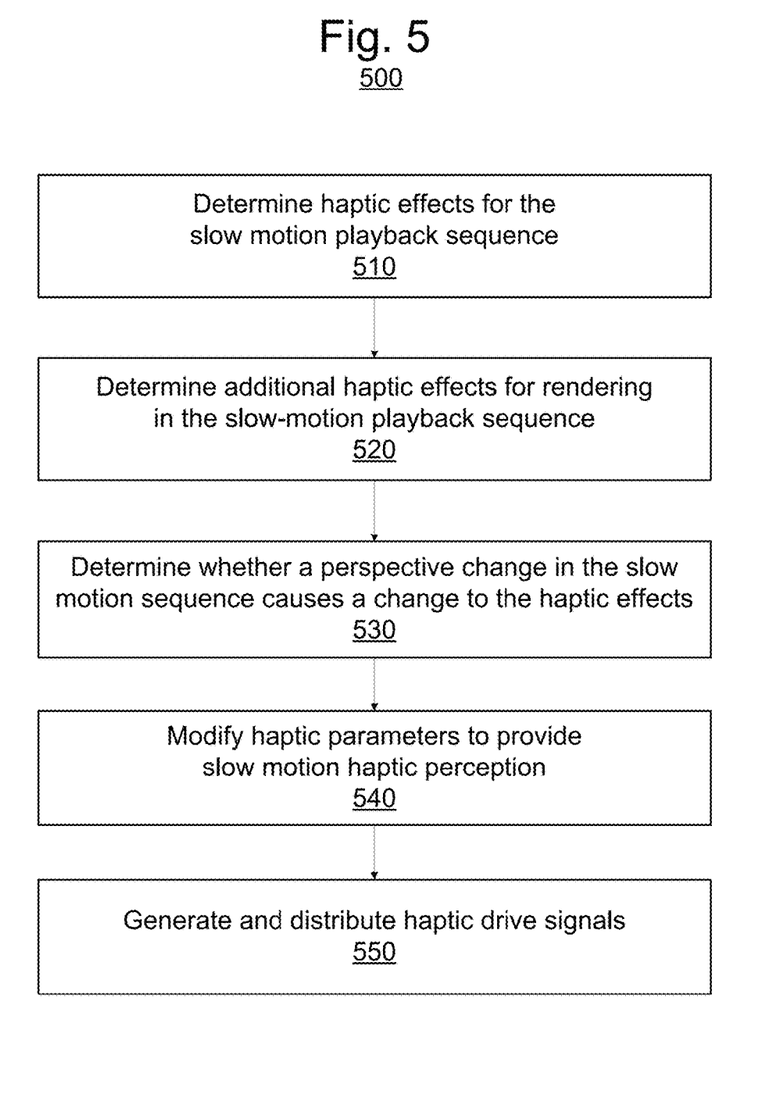
FIG. 5 illustrates a flow diagram for modifying haptic effects according to an example embodiment of the present invention.

FIG. 5 illustrates a flow diagram of functionality 500 for modifying haptic effects according to an example embodiment of the present invention. In some instances, the functionality of the flow diagram of FIG. 5 is implemented by software stored in memory or other computer readable or tangible media, and executed by a processor. In other instances, the functionality may be performed by hardware (e.g., through the use of an application specific integrated circuit ("ASIC"), a programmable gate array ("PGA"), a field programmable gate array ("FPGA"), etc.), or any combination of hardware and software.

At the outset, functionality 500 determines one or more haptic effects to include in a modified playback sequence, such as a slow motion sequence. For example, the haptic effects may include a subset or the entire set of haptic effects. Next, at 520, functionality 500 determines whether additional haptic effects that were not rendered during the real-time sequence should be rendered in the slow motion playback sequence.

At 530, functionality 500 determines whether the media steam, especially a video steam, includes a perspective change. For example, the detected perspective change in the slow motion playback sequence may cause a translation in the display locations of the haptic effects. Next, at 540, functionality 500 may modify one or more haptic parameters, such as duration, magnitude, frequency, and other haptic parameters, such that the user's haptic perception of the event is equivalent to that which was triggered in the original (regular speed).

Lastly, at 550, the haptic drive signals may be generated and distributed among the haptic output devices. Haptic drive signal may be generated by a software application, such as a gaming application. In some instances, functionality 500 may further distribute the operational characteristics associated with each of the haptic output devices. Here, one or more data structures may store the operational characteristics for respective haptic output devices.

Figure 6:
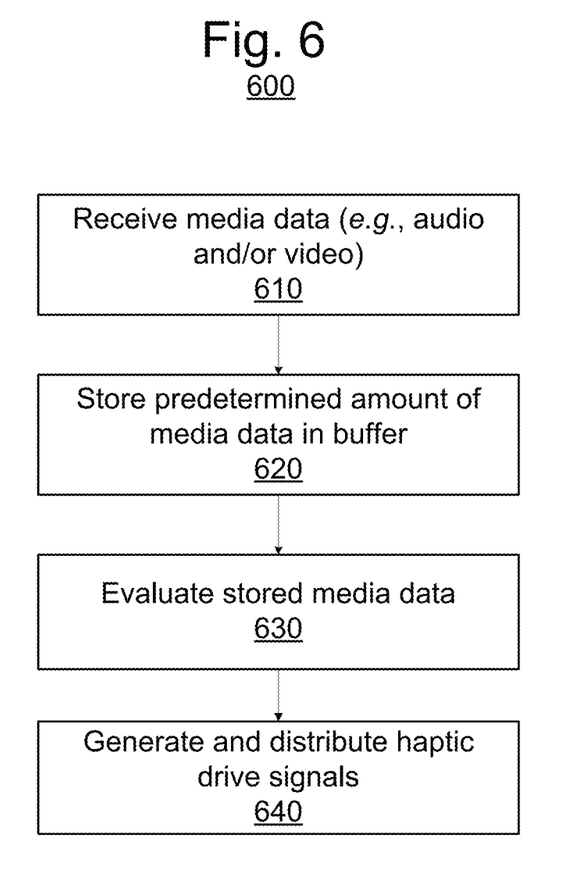
FIG. 6 illustrates a flow diagram for modifying haptic effects according to another example embodiment of the present invention.

FIG. 6 illustrates a flow diagram of functionality 600 for modifying haptic effects according to an example embodiment of the present invention.

At the outset, functionality 600 receives media data, such as an audio or video stream, at 610. The media stream is received from an application program or other software layer or program running on the host device. Next, at 620, a predetermined amount of the received media data is stored. For example, a predetermined number of media segments may be stored to enable quick processing and the determination of haptic effects.

Subsequently, at 630, the stored media data is evaluated to identify particular media characteristics or features which as relevant in the determination of which haptic effects are to be output. For example, the embodiments may use intelligent heuristics to extract media features (e.g., change in video brightness or contrast, or change in sound volume, etc.) that are likely to have meaning in an application program and to associate such media features with changes to the haptic effects that correspond appropriately with the extracted media features and the likely events these features represent. In another example, the embodiments may use intelligent heuristics to distinguish between gradual haptic effects that are modified in slow motion (e.g., car skidding or rolling down a hill) and discrete haptic effects that are not modified (e.g., gunshot). In some instances, a duration threshold (e.g., 250 ms) may be used to distinguish between gradual and discrete haptic effects. Haptics may be applied to a variety of events, and likely events in many current video game applications may be explosions from bombs, grenades, missiles, etc., the firing of a weapon such as a gun or rocket, the crash of a vehicle, the patter of footsteps, the sound of an object splashing into water, an alert sound for alerting the player to some game event, etc. These events may have particular audio and video features which can be recognized from the received media data after appropriate analysis.

Lastly, at 640, the haptic drive signals may be generated and distributed among the haptic output devices.

Figure 7:
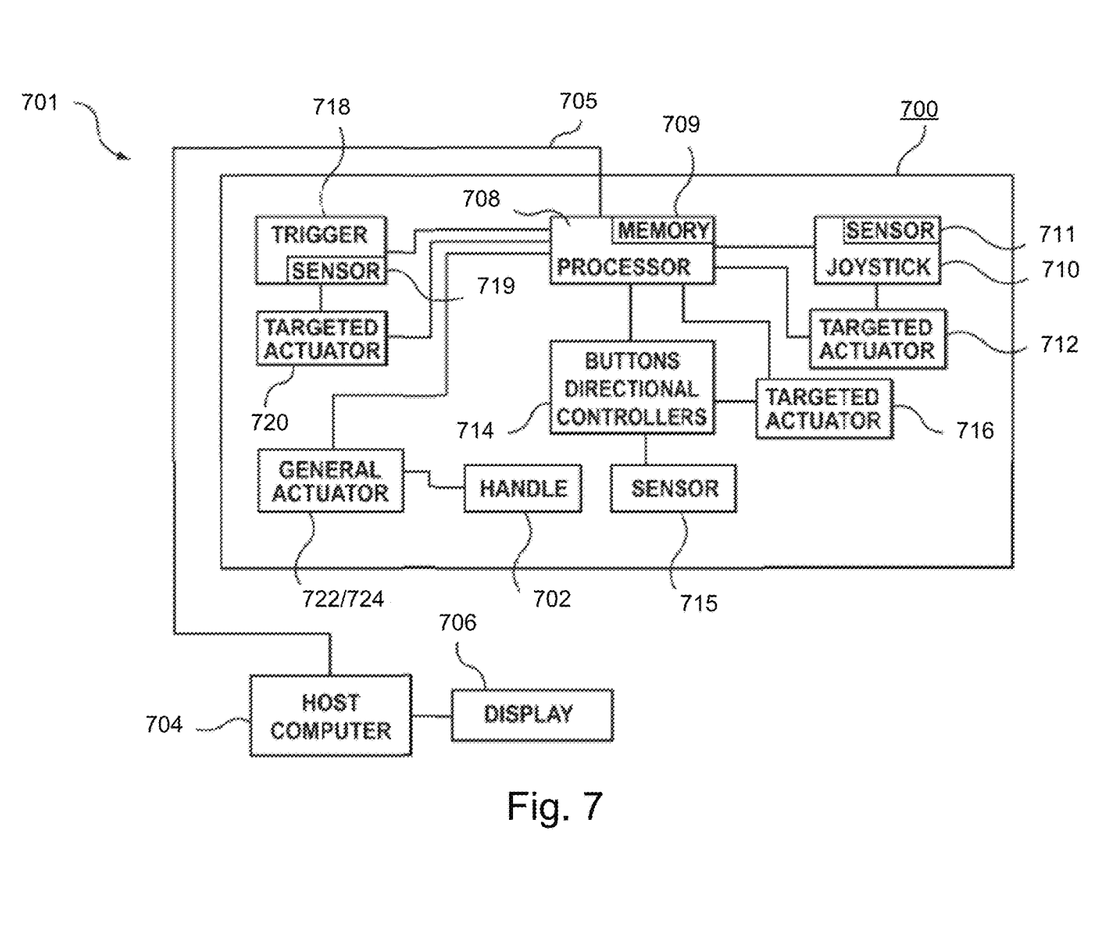
FIG. 7 illustrates a functional block diagram of a controller suitable for use with the embodiments of the present invention.

FIG. 7 illustrates a functional block diagram of a controller 700 suitable for use with the embodiments of the present invention.

As illustrated in FIG. 7, controller 700 may include one or more of a variety of user input elements. A user input element may refer to any interface device manipulated by the user to interact with host computer 704. Example user input elements include analog or digital joy stick 710, button 714, trigger 718, and the like. As understood by one of ordinary skill in the art, one or more of each user input element may be included on controller 700. For example, the present description of trigger 718 does not limit controller 700 to a single trigger. Similarly, those skilled in the art understand that multiple analog or digital sticks, buttons, and other user input elements may be used.

Controller 700 may include local processor 708. Local processor 708 may exchange commands and data with host computer 704 via connection 705. Connection 705 may be a wired or wireless connection using one or more communication protocols known to those skilled in the art. In some instances, controller 700 may be alternatively configured to not include local processor 708. Here, input/output signals from controller 700 may be handled and processed directly by host computer 704. Host computer 704 may be a gaming device console and display device 706 may be screen which is operably coupled to the gaming device console. In some instances, host computer 704 and display device 706 may be combined into a single device.

Controller 700 may include targeted actuators 712, 716, 720 (e.g., motors) to directly drive each of the user input elements thereof as well as one or more general or rumble actuators 722, 724 operably coupled to housing 902 in a location where a hand of the user is generally located. More particularly, analog or digital stick 710 includes a targeted actuator or motor 712 operably coupled thereto, button 714 includes a targeted actuator or motor 716 operably coupled thereto, and trigger 718 includes a targeted actuator or motor 720 operably coupled thereto. In addition to a plurality of targeted actuators, controller 700 includes a position sensor operably coupled to each of the user input elements thereof. More particularly, analog or digital stick 710 includes a position sensor 711 operably coupled thereto, button 714 includes a position sensor 715 operably coupled thereto, and trigger 718 includes a position sensor 719 operably coupled thereto. Local processor 708 is operably coupled to targeted actuators 712, 716, 720 as well as position sensors 711, 715, 719 of analog or digital stick 710, button 714, and trigger 718, respectively. In response to signals received from position sensors 711, 715, 719, local processor 708 instructs targeted actuators 712, 716, 720 to provide directed or targeted kinesthetic effects directly to analog or digital stick 710, button 714, and trigger 718, respectively. Such targeted kinesthetic effects are discernible or distinguishable from general or rumble haptic effects produced by general actuators 722, 724 along the entire body of the controller. The collective haptic effects provide the user with a greater sense of immersion to the game as multiple modalities are being simultaneously engaged (e.g., video, audio, and haptics).

Figure 8A:
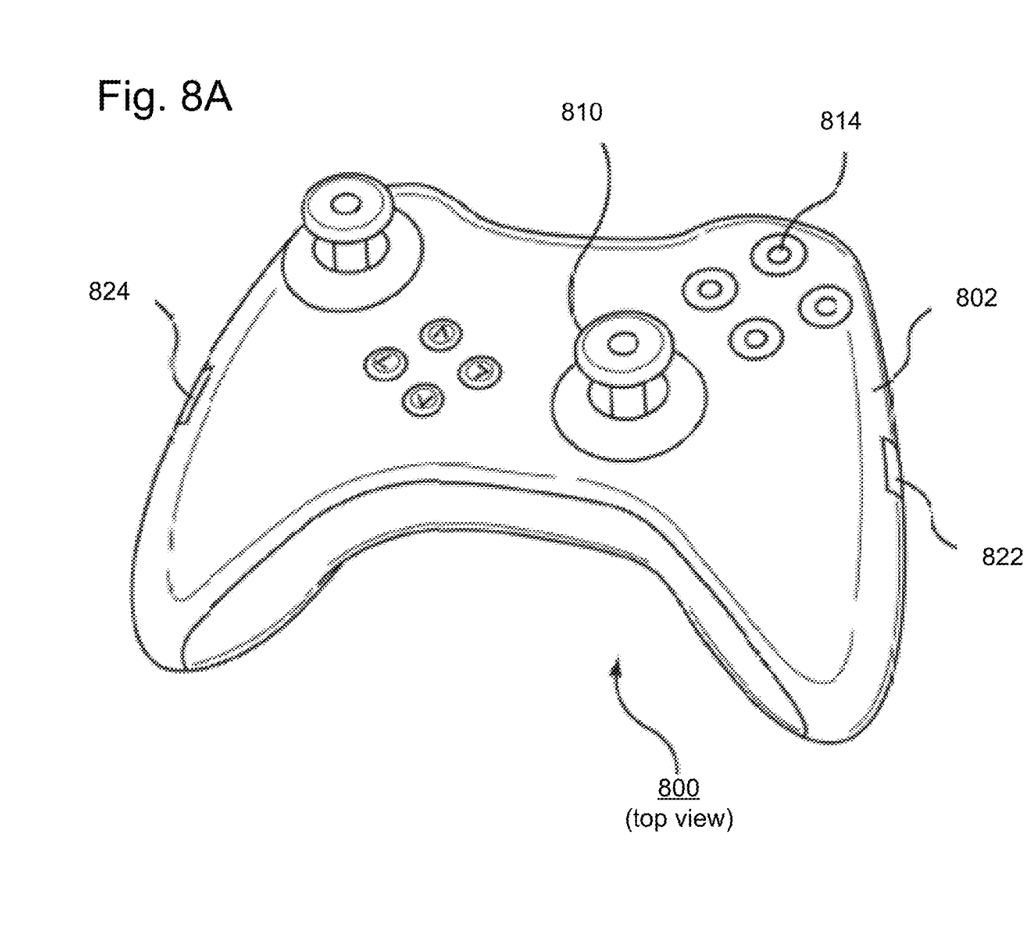
FIGS. 8A and 8B illustrate different views of a controller suitable for use with the embodiments of the present invention.
Figure 8B:
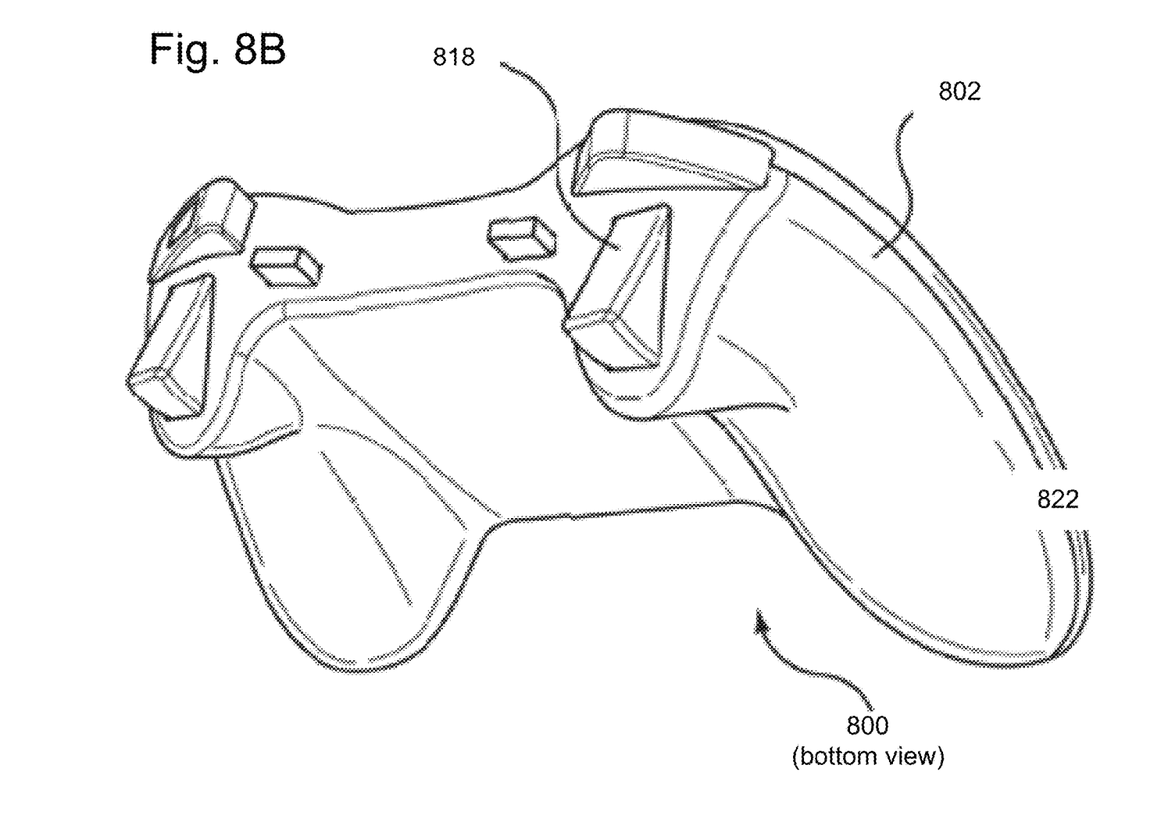

FIGS. 8A and 8B illustrate different views of a controller 800 suitable for use with the embodiments of the present invention. As shown in FIG. 8A and FIG. 8B, controller 800 may include a variety of components such as housing 802, analog or digital joy stick 810, button(s) 814, trigger 818, and rumble actuators 822 and 824.

Housing 802 is shaped to easily accommodate user gripping of controller 1000. Controller 800 is an example embodiment of a controller, and the embodiments of the invention may be readily applied to other controller shapes.

Accordingly, the embodiments described herein provide systems and methods for generating and modifying a haptic effect. Haptic effects are rendered in slow motion by modifying the various parameters associated with each haptic effect of a haptic effect sequence. For example, the magnitude, frequency, and/or duration of each haptic effect may be altered to accurately convey the haptic effect sequence in slow motion.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for rendering haptic effects in slow motion, the method comprising:
   receiving a media stream and a haptic effect sequence that corresponds to a real-time rendering of the media stream, the haptic effect sequence including a plurality of haptic effects;
   analyzing the media stream to extract one or more features of the media steam used to calculate a parameter of at least one haptic effect of the haptic effect sequence;
   determining a modified haptic effect sequence that corresponds to a slow motion rendering of the media stream; and
   rendering the media stream and the modified haptic effect sequence in slow motion,
   wherein the modified haptic effect sequence includes a change to the parameter according to a replay speed, the modified haptic effect sequence including at least one haptic effect that is elongated or weakened, and the modified haptic effect sequence including additional haptic effects that are not included in the haptic effect sequence.

2. The method according to claim 1, wherein the modified haptic effect sequence is determined according to a characteristic of the media stream.

3. The method according to claim 1, wherein the parameter includes one of magnitude, frequency, or duration of the haptic effect.

4. The method according to claim 1, wherein the modified haptic effect sequence includes a first subset of haptic effects having a modified duration and a second subset of haptic effects having a duration that is not modified.

5. The method according to claim 1, wherein the modified haptic effect sequence is produced at one or more user input elements of a peripheral device.

6. The method according to claim 1, wherein the modified haptic effect sequence is produced at one or more trigger or rumble output devices.

7. The method according to claim 1, wherein the media stream and the haptic effect sequence are rendered in real-time prior to rendering the media stream and a modified haptic effect sequence in slow motion.

8. A non-transitory computer readable storage medium storing one or more programs configured to be executed by a processor, the one or more programs comprising instructions for:

receiving a media stream and a haptic effect sequence that corresponds to a real-time rendering of the media stream, the haptic effect sequence including a plurality of haptic effects;

analyzing the media stream to extract one or more features of the media steam used to calculate a parameter of at least one haptic effect of the haptic effect sequence;

determining a modified haptic effect sequence that corresponds to a slow motion rendering of the media stream; and rendering the media stream and the modified haptic effect sequence in slow motion, wherein the modified haptic effect sequence includes a change to the parameter according to a replay speed, the modified haptic effect sequence including at least one haptic effect that is elongated or weakened, and the modified haptic effect sequence including additional haptic effects that are not included in the haptic effect sequence.

9. The non-transitory computer readable storage medium according to claim 8, wherein the modified haptic effect sequence is determined according to a characteristic of the media stream.

10. The non-transitory computer readable storage medium according to claim 8, wherein the parameter includes one of magnitude, frequency, or duration of the haptic effect.

11. The non-transitory computer readable storage medium according to claim 8, wherein the modified haptic effect sequence includes a first subset of haptic effects having a modified duration and a second subset of haptic effects having a duration that is not modified.

12. The non-transitory computer readable storage medium according to claim 8, wherein the modified haptic effect sequence is produced at one or more user input elements of a peripheral device.

13. The non-transitory computer readable storage medium according to claim 8, wherein the modified haptic effect sequence is produced at one or more trigger or rumble output devices.

14. The non-transitory computer readable storage medium according to claim 8, wherein the media stream and the haptic effect sequence are rendered in real-time prior to rendering the media stream and a modified haptic effect sequence in slow motion.

15. A device comprising:
a processor; and
a memory storing one or more programs for execution by the processor, the one or more programs including instructions for:

receiving a media stream and a haptic effect sequence that corresponds to a real-time rendering of the media stream, the haptic effect sequence including a plurality of haptic effects;

analyzing the media stream to extract one or more features of the media steam used to calculate a parameter of at least one haptic effect of the haptic effect sequence;

determining a modified haptic effect sequence that corresponds to a slow motion rendering of the media stream; and rendering the media stream and the modified haptic effect sequence in slow motion, wherein the modified haptic effect sequence includes a change to the parameter according to a replay speed, the modified haptic effect sequence including at least one haptic effect that is elongated or weakened, and the modified haptic effect sequence including additional haptic effects that are not included in the haptic effect sequence.

16. The device according to claim 15, wherein the modified haptic effect sequence is determined according to a characteristic of the media stream.

17. The device according to claim 15, wherein the parameter includes one of magnitude, frequency, or duration of the haptic effect.

18. The device according to claim 15, wherein the modified haptic effect sequence includes a first subset of haptic effects having a modified duration and a second subset of haptic effects having a duration that is not modified.

19. The device according to claim 15, wherein the modified haptic effect sequence is produced at one or more user input elements of a peripheral device.

20. The device according to claim 15, wherein the modified haptic effect sequence is produced at one or more trigger or rumble output devices.

21. The device according to claim 15, wherein the media stream and the haptic effect sequence are rendered in real-time prior to rendering the media stream and a modified haptic effect sequence in slow motion.

\* \* \* \* \*